United States Patent [19]

Kotian et al.

[11] Patent Number: 5,473,654
[45] Date of Patent: Dec. 5, 1995

[54] BACKPROJECTION FOR X-RAY CT SYSTEM

[75] Inventors: François Kotian, Brookfield; Gregg W. Martin, Hartland; Stephen W. Metz, Milwaukee; Arthur K. Collins, Waukesha, all of Wis.; Michael A. Wu, Oro Valley, Ariz.

[73] Assignee: General Electric Company, Milwaukee, Wis.

[21] Appl. No.: 265,547

[22] Filed: Jun. 24, 1994

[51] Int. Cl.[6] .......................... A61B 6/03; G01N 23/083
[52] U.S. Cl. ................................................. 378/4; 378/901
[58] Field of Search ................................. 378/4, 15, 901

[56] References Cited

U.S. PATENT DOCUMENTS 4,365,339  12/1982  Parkovich et al. ..................... 378/15
4,896,287  1/1990  O'Donnell et al. ..................... 364/754
5,241,576  8/1993  Lonn ..................................... 378/19
5,359,638  10/1994  Hsieh et al. ............................ 378/4

*Primary Examiner*—David P. Porta
*Assistant Examiner*—David Vernon Bruce
*Attorney, Agent, or Firm*—Quarles & Brady

[57] ABSTRACT

An x-ray CT system acquires a series of views during a scan and reconstructs a slice image by backprojecting the filtered projection data from each acquired view. Backprojection is facilitated by employing a Cordic processor that produces the angle ($\gamma$) and distance (L) of each pixel location from the x-ray source. The angle ($\gamma$) selects the proper value from the filtered projection data, and this value is divided by the square of the distance (L) to arrive at a value used to update the slice image pixel value.

5 Claims, 2 Drawing Sheets

DETECTOR SAMPLES
$R(\beta_i, \gamma_j)$

BACKPROJECTION FOR X-RAY CT SYSTEM

BACKGROUND OF THE INVENTION

The present invention relates to computed tomography (CT) imaging apparatus; and more particularly, to the backprojection of the attenuation data acquired during a scan to form an image.

In a computed tomography system, an x-ray source projects a fan-shaped beam which is collimated to lie within an X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the imaging plane of the object.

The prevailing method for reconstructing an image from 2D data is referred to in the art as the filtered backprojection technique. The image is reconstructed from a set of views collected during one rotation. Steps for reconstruction include preprocessing, spatial filtering, and backprojection. Preprocessing includes a number of computational steps to correct the view data and to convert the data into line integral measurements. The resulting converted and corrected views are called "projections". Spatial filtering involves convolution of the projection data with a reconstruction filter kernel. Backprojection follows, and is a process of mapping the filtered projections into the image plane to create the actual image.

Preprocessing and spatial filtering involve standard mathematical operations at a processing rate often encountered in signal processing. These steps can be implemented using standard digital signal processing hardware. Backprojection requires a much higher processing rate and requires customized, dedicated hardware for efficient implementation. Backprojection of each view requires the performance of three steps for each pixel in the 2D image. First, the value of the filtered projection data must be found for the ray passing through the pixel. Usually this step requires interpolating between two adjacent filtered projection values. Second, the source-to-pixel distance is calculated, and finally, the value of the filtered projection data for the ray passing through the pixel is divided by the square of the source-to-pixel distance. These steps may require the use of three look-up tables and four separate interpolation operations to perform using current methods. As a result, image reconstruction on current CT systems is complex, costly, and a limiting factor in patient throughput.

SUMMARY OF THE INVENTION

The present invention relates to the image reconstructor in an x-ray CT system, and particularly to an improved method for backprojecting a filtered projection. More specifically, for each pixel in the reconstructed image the angle ($\gamma$) of the projection data to be applied to the pixel and the distance (L) of the pixel from the x-ray source are then calculated by a Cordic processor which receives as inputs the pixel location, the data (R) to be projected is calculated from the filtered projection using the angle ($\gamma$), the distance (L) is squared; and the contribution of the filtered projection to the pixel value is calculated by dividing the data (R) by the square of the distance (L).

A general object of the invention is to simplify the backprojection process so that it can be rapidly performed. By using a cordic processor such as that described in U.S. Pat. No. 4,896,287 issued on Jan. 23, 1990 and entitled "Cordic Complex Multiplier", the angle ($\gamma$) and distance (L) can be calculated directly in a pipelined structure. Similarly, the square and divider functions may be implemented in a pipelined structure which enables a high throughput rate.

Yet another object of the invention is to reduce the need for look-up tables and interpolation steps. No look-up tables are required with the invented method and the only interpolation is that required to calculate the data (R) from the filtered projection data.

General Description Of The Invention

Figure 4:
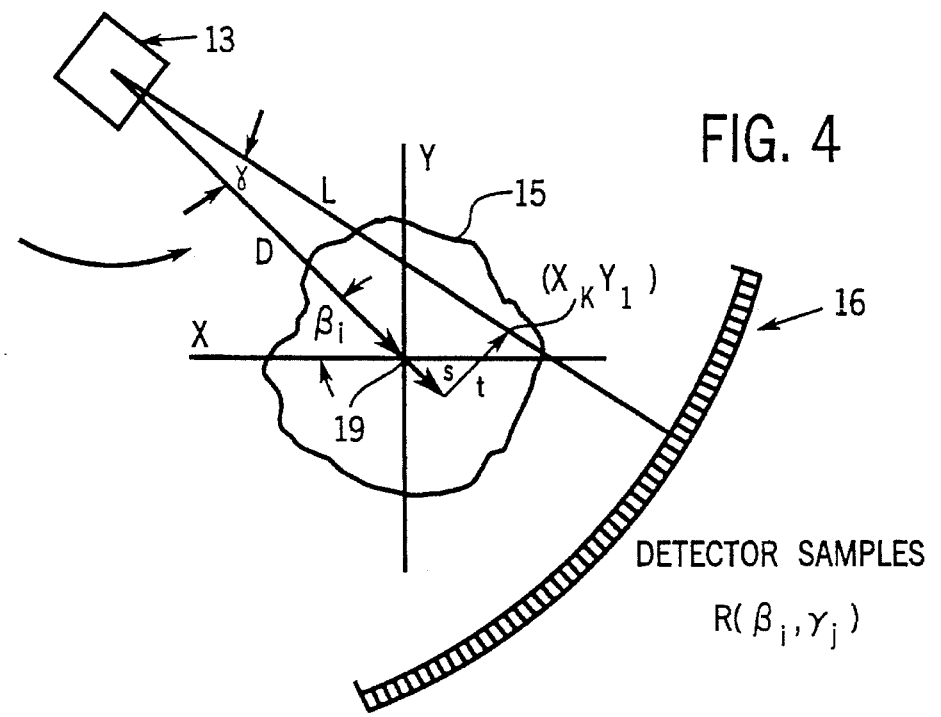
FIG. 4 is a graphic representation of the fan beam geometry.

The basic geometry for backprojecting a set of corrected and filtered detector samples $R(\beta_i, \gamma_j)$ for a particular pixel is shown in FIG. 4. The pixel is located at coordinates $(x_k, Y_1)$ and the gantry angle is $\beta$ (for view number i). D is the distance from the x-ray source 13 to the isocenter 19, and $\gamma$ is the angle between a ray passing through the isocenter 19 and a ray passing through the pixel.

Backprojection of the detector samples $R(\beta_i, Y_j)$ is accomplished in three steps for each pixel. First, the value of the filtered detector data must be calculated for the ray passing through the pixel. This requires calculation of the angle $\gamma$ and it usually requires interpolation between the filtered detector samples that lie to each side of this angle $\gamma$ to yield the precise filtered projection value $R(\beta_i, \gamma)$. Second, the distance L between the x-ray source 13 and the pixel $(x_k, Y_1)$ is calculated, and finally the value $R(\beta_i, \gamma)/L^2$ is calculated and added to the pixel value.

To simplify some of these calculations, an alternative coordinate system defined by s and t is used rather than x and y. The s axis lies along the line from the source to isocenter 19 while the t axis passes through isocenter 19 at a right angle to the s axis. Thus the s and t coordinates are simply the x and y coordinates rotated by the gantry angle. Values for s are positive from isocenter 19 towards the detector and negative from isocenter 19 towards the source 13. Values for t are positive for positive $\gamma$ and negative for negative $\gamma$.

The value of $\gamma$ using this coordinate system is given by the following equation:

$$\gamma = \tan^{-1}\left(\frac{t}{D+s}\right).$$

Rarely will γ exactly equal one of the discrete $y_j$ values that corresponds to one of the detector samples $R(\beta_i,\gamma_j)$. Instead, γ will usually lie between two $\gamma_j$ values. In this general case linear interpolation is used to approximate the actual value of $R(\beta_i,\gamma)$.

Using the Pythagorean theorem the value of L may be calculated as follows:

$$L = \sqrt{t^2 + (D+s)^2}.$$

An important discovery of the present invention is that the values of γ and L can be calculated directly by a pipelined Cordic processor such as that described in the above cited U.S. Pat. No. 4,986,287 and described by J. E. Volder, "The CORDIC Trigonometric Computing Technique", *IRE Transactions on Electronic Computers*, September 1959, pp. 330–334. This Cordic processor accepts as inputs two values A and B and makes the following computations:

$$\theta = \tan^{-1}(B/A)$$

$$r = K\sqrt{A^2 + B^2}$$

where:

$$K = \prod_{i=0}^{n-2} \sqrt{1+2^{-2i}}$$

through a series of n vector rotation of angle and scaling steps. By substituting the pixel coordinate t for input B and the pixel coordinate D+s for the input A, the Cordic processor calculates the values of γ and KL directly. The inputs t and D+s can be prescaled by dividing by K and the desired values of γ and L are produced. K is a constant based on the number of pipeline stages used to impliment the Cordic processor. The filtered projection data value $R(\beta_i,\gamma)$ is then determined using γ, and it is divided by $L^2$ to produce the amount added to the pixel value. Each acquired view during the scan is backprojected in this manner to each pixel in the 2D image being reconstructed.

DESCRIPTION OF THE PREFERRED EMBODIMENT

Figure 1:
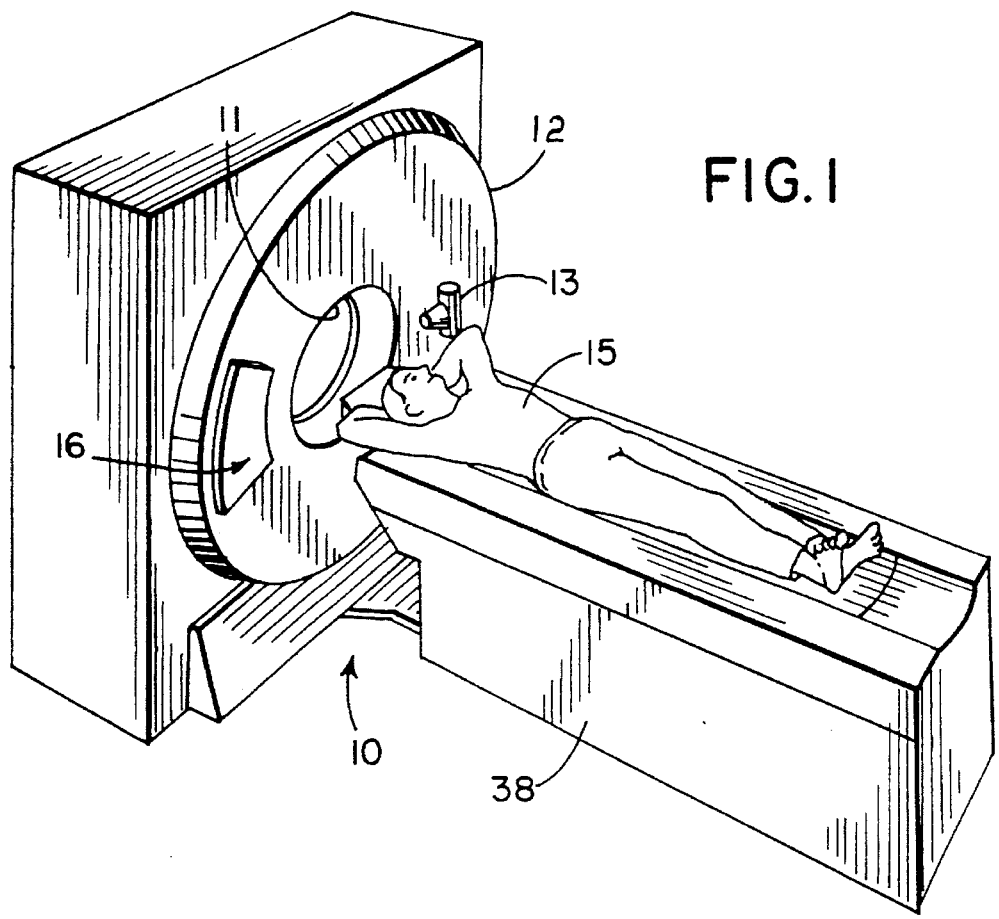
FIG. 1 is a pictorial view of a CT imaging system in which the present invention may be employed.
Figure 2:
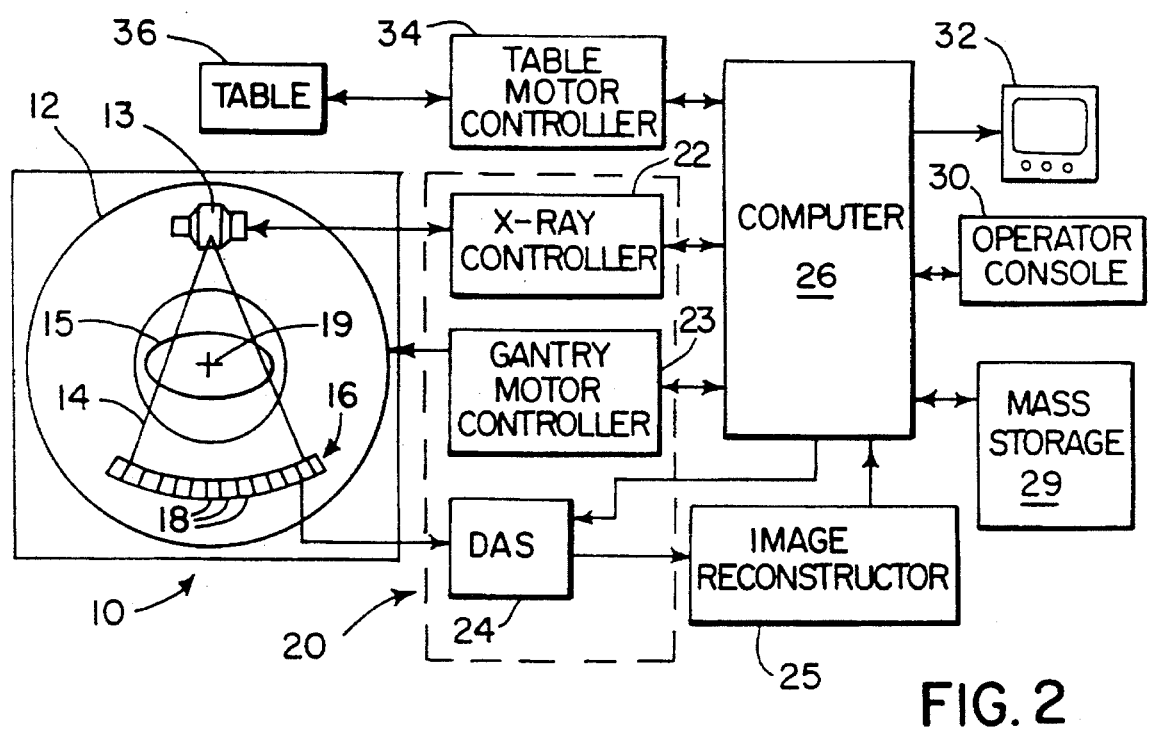
FIG. 2 is a block schematic diagram of the CT imaging system.

With reference to FIGS. 1 and 2, a computed tomography (CT) imaging system 10 includes a gantry 12 representative of a "third generation" CT scanner. Gantry 12 has an x-ray source 13 that projects a cone beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by a control mechanism 20 of the CT system. The control mechanism 20 includes an x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction according to the method of the present invention. The reconstructed image is applied as an input to a computer 26 which stores the image in a mass storage device 29.

The computer 26 also receives commands and scanning parameters from an operator via console 30 that has a keyboard. An associated cathode ray tube display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

Figure 3:
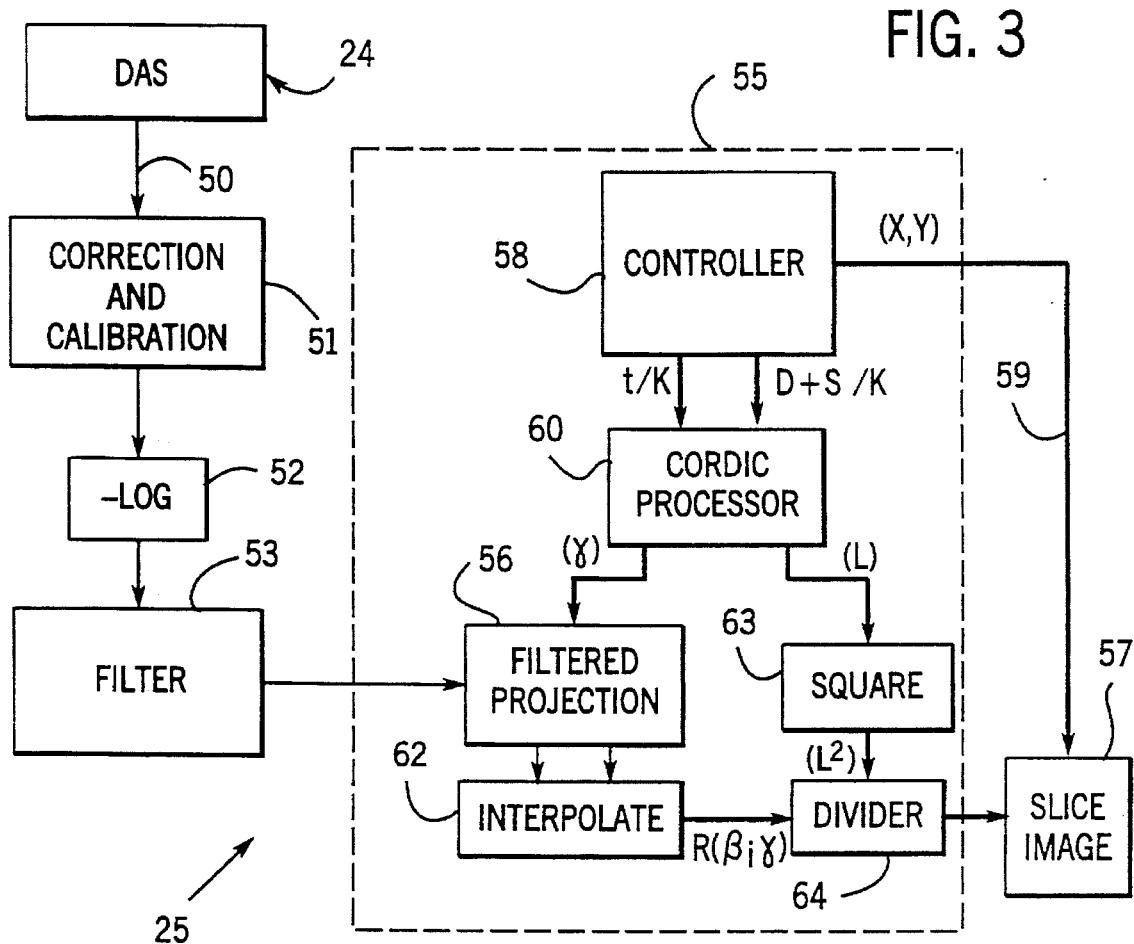
FIG. 3 is a block diagram of the image reconstructor which employs the present invention and which forms part of the CT image system of FIG. 2.

During a scan a series of views ($\beta_i$) of the patient 15 is acquired as the gantry 12 rotates about the axis 19. Each view is a set of x-ray scan data values which indicate the number of x-ray photons sensed by the respective detector elements ($\gamma_j$). Referring particularly to FIG. 3, each view of scan data is received at input 50 from the DAS 24 and processed at 51 to correct for various well known errors such as variations in detector and channel gains. The corrected data is next log adjusted at 52 by taking the negative of its logarithm to provide a projection profile which indicates the amount of attenuating material in the patient 15 along the x-ray beam associated with each detector element 18. The projection profile is then filtered at 53 by convolving it with a reconstruction filter kernel in preparation for backprojection.

Referring still to FIG. 3, each filtered projection profile $R(\beta_i,\gamma_j)$ is applied to a backprojector 55 which stores the values at 56. In accordance with the present invention, the backprojector 55 determines from the filtered projection profile $R(\beta_i,\gamma_j)$ what values must be added to each pixel (x,y) in a slice image 57 being reconstructed. A controller 58 operates the reconstructor 55 by outputting the x and y dimensions of the pixel to be updated at 59, and by outputting the corresponding values t/K and (D+s)/K for this pixel to a Cordic processor 60. As explained above, the Cordic processor 60 calculates values for γ and L, and the value for γ is then used to read the two adjacent values from the filtered projection 56. These two values and the value for γ are applied to an interpolator 62 which linearly interpolates between the two values to produce the filtered projection value $R(\beta_i,\gamma)$ for the ray through the pixel x,y.

The value of L produced by the Cordic processor 60 is squared in a multiplier 63 and applied to a divider 64 that divides the filtered projection value $R(\beta_i,\gamma)$ by the distance squared of the pixel from the x-ray source 13 ($L^2$). The controller 58 repeats this backprojection process for each pixel in the slice image 57 to completely backproject the filtered projection data for one view. The next view is then applied to the backprojector 55 and the process repeats to update each pixel value in the slice image 57 with the contribution from this view. When all the views have been acquired and backprojected, the slice image 57 accurately depicts a view in cross section taken through the patient 15 in the plane of the x-ray fan beam 14.

We claim:

1. A method for reconstructing an image from projection data acquired from a series of views taken through a slice, the steps comprising:

a) acquiring x-ray projection data at one of said views through the slice;

b) filtering the acquired view of x-ray projection data;

c) backprojecting the view of filtered x-ray projection data to update the value of each of a plurality of pixels in a slice image by:

i) applying information indicative of the location of one of said pixels to a Cordic processor which generates an angle ($\gamma$) indicative of the location of an x-ray passing through the pixel location and a distance (L) indicative of the distance of the pixel location from an x-ray source;

ii) calculating from the filtered x-ray projection data using the angle ($\gamma$) a projection data value indicative of the x-rays passing through the pixel location;

iii) dividing the projection data value by the square of the distance (L) and updating said one pixel value with the result; and iv) repeating steps (i), (ii) and (iii) until all of said pixel values have been updated; and d) repeating steps a), b) and c) until all of said views in the series have been acquired and backprojected.

2. The method as recited in claim 1 in which the calculating in step ii) includes selecting two values from the filtered x-ray projection data using the angle ($\gamma$), and interpolating between said two selected values.

3. The method as recited in claim 1 in which the information input to the Cordic processor indicative of the location of said one pixel includes:

a first input (t/K) indicative of the distance of said pixel location from a system isocenter as measured in a direction perpendicular to an x-ray in the view passing through the isocenter;

a second input ((D+s)/K) indicative of the distance of the isocenter from the x-ray source plus the distance of said pixel location from the system isocenter as measured in the direction of an x-ray in the view passing through the isocenter.

4. The method as recited in claim 3 in which the Cordic processor generates the angle (y) by calculating $$\gamma = \tan^{-1}(t/(D+s)).$$

5. The method as recited in claim 3 in which the Cordic processor generates the distance (L) by calculating $$L = \sqrt{(D+s)^2 + t^2}.$$

* * * * *